W. B. BURKE.
APPARATUS FOR VULCANIZING RUBBER AND METHOD OF MAKING SAME.
APPLICATION FILED MAY 23, 1919.
1,339,736.
Patented May 11, 1920.
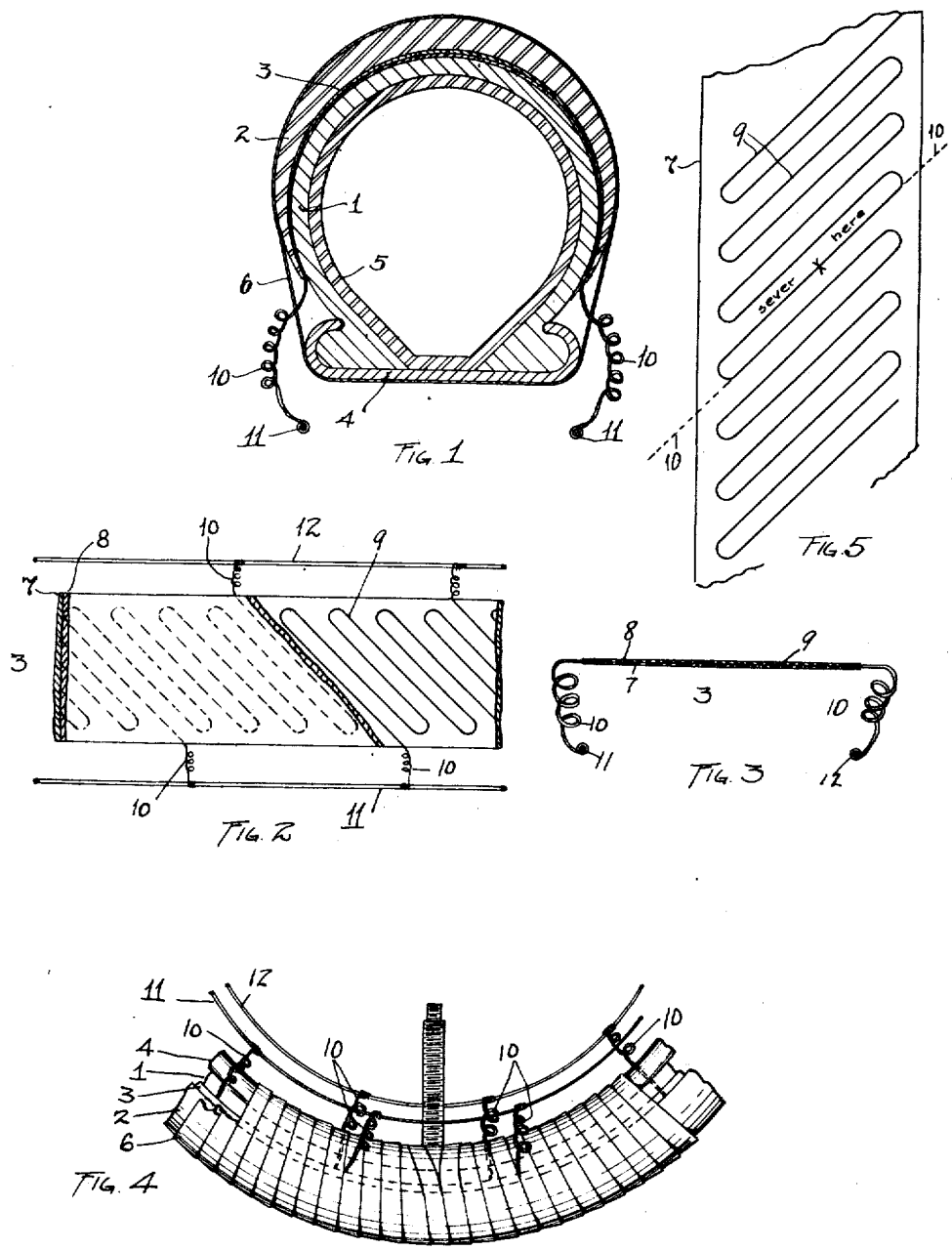
INVENTOR.
Wilbur B. Burke
BY Fay, Oberlin & Fay
ATTORNEYS

UNITED STATES PATENT OFFICE.

WILBUR B. BURKE, OF CLEVELAND, OHIO, ASSIGNOR TO THE ELECTRIC VULCANIZING RUBBER COMPANY, OF AKRON, OHIO, A CORPORATION OF OHIO.

APPARATUS FOR VULCANIZING RUBBER AND METHOD OF MAKING SAME.

1,339,736.  Specification of Letters Patent.  Patented May 11, 1920.

Application filed May 23, 1919. Serial No. 299,290.

*To all whom it may concern:*

Be it known that I, WILBUR B. BURKE, a citizen of the United States, and a resident of Cleveland, county of Cuyahoga and State of Ohio, have invented a new and useful Improvement in Apparatus for Vulcanizing Rubber and Methods of Making Same, of which the following is a specification, the principle of the invention being herein explained and the best mode in which I have contemplated applying that principle, so as to distinguish it from other inventions.

The present improvement relates more particularly to apparatus or equipment and method of making same designed for use in connection with an improved method of vulcanizing tire treads to casings, which forms the subject matter of United States Letters Patent No. 1,216,654, granted to me under date of February 20, 1917. It will be understood of course that just as such method is not limited to the specific use stated, but relates generally to the vulcanizing of rubber by forming an electrical heating element in contact with a layer of fresh rubber, placing such layer and such element in contact with the parts to be vulcanized together, and then passing a suitable current through such heating element, so the present improvement may be utilized in other connections than the specific one indicated.

The object of the present invention is to provide an improved vulcanizing element for use in connection with the aforesaid method, not only one that can be more readily constructed or assembled, but also better adapted to carry out the retreading or analogous operation in which such element is employed.

To the accomplishment of the foregoing and related ends, the invention, therefore, then consists of the means and steps hereinafter fully described and particularly pointed out in the claims, the annexed drawing and the following description setting forth in detail certain mechanism embodying the invention, such disclosed means illustrating, however, but one of the various ways in which the principle of the invention may be used.

In said annexed drawing:—

Figure 1 is a cross-sectional view of a worn tire casing or carcass arranged for the application of a new tread thereto in accordance with my aforesaid method and utilizing the present improved apparatus; Fig. 2 is a plan view of my improved vulcanizing element with a portion broken away to better illustrate its construction; Fig. 3 is a transverse section of such element; Fig. 4 is a side elevational view of the complete casing as prepared for the vulcanizing operation; and Fig. 5 is a view more or less diagrammatic in character illustrating the manner in which the heating wire, which constitutes a part of the element, is prepared or formed for inclusion therein.

Referring to Fig. 1, the tire casing or carcass 1, with the tread 2 and interposed vulcanizing element 3, are there shown properly arranged for the vulcanizing operation. To this end said casing is mounted on a rim 4, preferably a demountable rim of the sort ordinarily used on automobiles of the present day, in order to avoid the necessity of handling the wheel, which would constitute merely an incumbrance. The inner tube 5 is disposed in place with the casing or shoe ready to be inflated, as hereinafter described. Before placing the tread 2 upon such casing 1 the vulcanizing element 3 is applied about the entire circumference of said casing in the usual fashion, said element being in the form of a sheet of sufficient width to extend transversely of the casing approximately from the bead on the one side thereof to that on the other, or between corresponding points on a straight side casing.

Thereupon a tape 6, or the like, is wrapped or wound around the rim, casing and tread, so that upon inflation of the inner tube, such casing and tread will be pressed together under a proper degree of pressure, and a heating electric current will then be passed through the wire, which, as will be presently described, constitutes a part of the vulcanizing element 3, with the result that the parts of which such element is composed will be equally and uniformly vulcanized, thereby firmly uniting the tread and casing together.

As previously indicated, it is to the construction and mode of assembly of the parts composing the vulcanizing element 3 to which special interest attaches in the present case. As clearly shown in Figs. 2 and 3, such element is composed of two relatively thin layers 7 and 8 of fresh, *i. e.* unvulcanized rubber, which are laid one upon the other in close contact while in the condition stated, the result being that such layers stick together or coalesce so as to form, in effect, a single integral layer. Previously, however, to thus bringing such layers 7 and 8 into contact with each other, an electric resistance element in the form of a fine wire 9 is disposed between the same. This wire is preferably bent back and forth in the fashion shown in Fig. 5 and simultaneously laid on the exposed face of the one sheet, for example, sheet 7, so as to present a series of closely assembled parallel reverse loops that lie at an acute angle, (approximately 45 degrees as shown) to the median line of the sheet. After all the wire has been thus laid along the entire extent of the sheet of rubber it is severed at intervals, preferably at a point intermediate between two adjacent loops, i. e., midpoint with respect to the transverse dimension of the sheet, and the separate ends 10 bent outwardly to lie clear of the sheet, whereupon the other layer 8 is applied, with the result that the loops lying between the edges of the first mentioned sheet are firmly embedded in the resultant composite layer.

The number of loops composing the individual sections of wire between the points at which such wire is thus severed, as well as the degree of closeness with which the loops are initially assembled, will depend upon the character of the heating electric current, which it is desired to employ, as well of course as upon the character of the wire itself with respect to diameter, electrical resistance, etc.

The respective ends of each individual section, it will be observed, will extend beyond opposite edges of the composite sheet made up of layers 7 and 8, thus adapting these ends to be attached to larger conductors 11 and 12, respectively. When the complete vulcanizing element is applied to a tire casing or carcass in the fashion previously described these conductors 11 and 12 are bent into corresponding circular form, or, if considered more convenient, they may be thus bent into circular form and the ends 10 of the reduplicate wire 9 attached thereto after the composite sheet, made up of layers 7 and 8, has been placed on the casing 1, (see Figs. 1 and 4). Upon then properly connecting such conductors 11 and 12 with a suitable source of electricity a like current will be caused to flow through each of the sections into which the wire 9 has been subdivided, since these all contain the same number of loops and are connected in parallel across said conductors. As soon as the vulcanizing has been completed the wrapping 6 may be removed and the several projecting ends 10 of the wire 9 cut or trimmed off close to the side of the casing so as to present a finished appearance, and the operation is then complete.

It will be understood that a sectional mold of suitable form may be utilized to hold the tread 2 against expansion when pressure is applied within the casing by inflating the inner tube instead of utilizing the wrapping 6 described above. It will be also understood that while I have described my improved vulcanizing element as applied to a particular use it is equally adaptable for a variety of uses where a similar result is sought, and in particular it may be employed with entirely satisfactory results in the manufacture of new tires or like articles, its use being in no sense limited to the repairing of worn tire casings.

Other modes of applying the principle of my invention may be employed instead of the one explained, change being made as regards the steps or mechanism herein disclosed, provided the means stated by any of the following claims or the equivalent of such stated means be employed.

I therefore particularly point out and distinctly claim as my invention:—

1. A vulcanizing element comprising two coalescent layers of unvulcanized rubber, and an electric heating element interposed between said layers.

2. A vulcanizing element comprising two coalescent layers of unvulcanized rubber, and an electric heating wire interposed between, and having its ends projecting beyond the respective edges of said layers.

3. A vulcanized element comprising two coalescent layers of unvulcanized rubber, and a reduplicate heating wire interposed between, and having its ends projecting beyond the respective edges of said layers.

4. A vulcanizing element comprising two coalescent layers of unvulcanized rubber, and a reduplicate heating wire interposed between, and having its ends projecting beyond the respective edges of said layers, the successive loops of said wire lying parallel to each other and at an acute angle to the median line of said layers.

5. A vulcanizing element comprising two coalescent layers of unvulcanized rubber, and a reduplicate heating wire interposed between, and having its ends projecting beyond the respective edges of said layers, the successive loops of said wire lying parallel to each other and at an angle of 45° to the median line of said layers.

6. A vulcanizing element comprising a layer of unvulcanized rubber and a reduplicate heating wire in close contact therewith.

7. A vulcanizing element comprising a layer of unvulcanized rubber and a reduplicate heating wire in close contact therewith and having its ends projecting beyond the respective edges of said layer.

8. A vulcanizing element comprising a layer of unvulcanized rubber and a reduplicate heating wire in close contact therewith and having its ends projecting beyond the respective edges of said layer, the successive loops of said wire lying parallel to each other and at an acute angle to the median line of said layer.

9. A vulcanizing element comprising two coalescent layers of unvulcanized rubber, and a series of reduplicate electric heating wires interposed between, and having their ends projecting beyond the respective edges of said layers.

10. A vulcanizing element comprising two coalescent layers of unvulcanized rubber, and a series of reduplicate electric heating wires interposed between, and having their ends projecting beyond the respective edges of said layers, the successive loops of said wire lying parallel to each other and at an acute angle to the median line of said layers.

11. A vulcanizing element comprising two coalescent layers of unvulcanized rubber, conductor wires adjacent the respective edges of said layers, and a series of reduplicate electric heating wires interposed between, and having their respective ends projecting beyond the edges of such wires and attached to said conductors.

12. In a method of making a vulcanizing element, the steps which consist in reduplicating a wire to provide a series of parallel reverse loops, severing said wire at a point intermediate between two loops, and then bending the several ends outward.

13. In a method of making a vulcanizing element, the steps which consist in reduplicating a wire in contact with a layer of rubber so as to provide a series of parallel reverse loops, severing said wire at intervals at points intermediate between two loops, and then bending the severed ends outward so as to project beyond the edges of said layer.

14. In a method of making a vulcanizing element, the steps which consist in reduplicating a wire in contact with a layer of rubber so as to provide a series of parallel reverse loops, severing said wire at intervals at points intermediate between two loops, then bending the severed ends outward so as to project beyond the edges of said layer, and finally placing a second layer of rubber over the first so as to embed therebetween all of said wire except such projecting ends.

Signed by me this 20th day of May, 1919.

WILBUR B. BURKE.

It is hereby certified that in Letters Patent No. 1,339,736, granted May 11, 1920, upon the application of Wilbur B. Burke, of Cleveland, Ohio, for an improvement in "Apparatus for Vulcanizing Rubber and Methods of Making Same," an error appears in the printed specification requiring correction as follows: Page 2, line 98, claim 3, for the word "vulcanized" read *vulcanizing;* and that the said Letters Patent should be read with this correction therein that the same may conform to the record of the case in the Patent Office.

Signed and sealed this 31st day of August, A. D., 1920.

[SEAL.] M. H. COULSTON,

*Acting Commissioner of Patents.*

Cl. 18—6.